April 26, 1966  R. WESTFALL  3,247,586
ASSEMBLY ARRANGEMENT
Filed June 4, 1965  2 Sheets-Sheet 1

Robert Westfall
INVENTOR.
BY R. Frank Smith
Daniel P. Ogden
ATTORNEYS

April 26, 1966 R. WESTFALL 3,247,586
ASSEMBLY ARRANGEMENT
Filed June 4, 1965 2 Sheets-Sheet 2
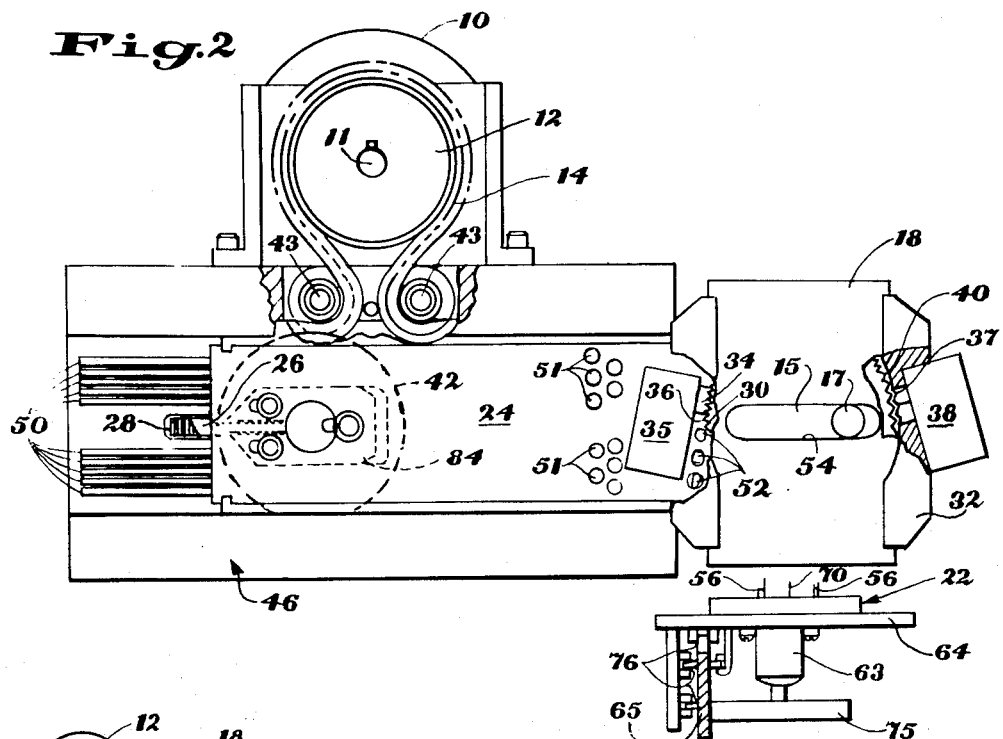
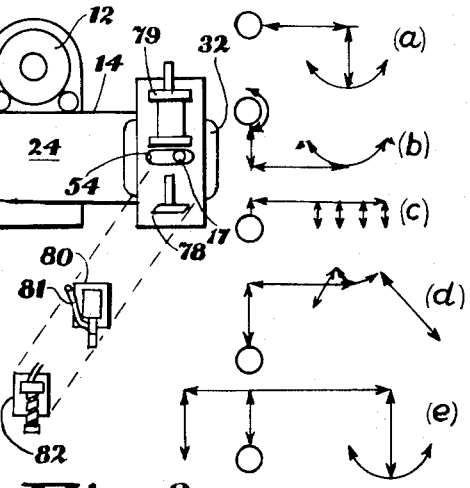
Fig.2
Fig.3
Fig.4
Robert Westfall
INVENTOR.
BY R. Frank Smith
David P. Ogden
ATTORNEYS 3,247,586
ASSEMBLY ARRANGEMENT
Robert Westfall, Rochester, N.Y., assignor to Eastman Kodak Company, Rochester, N.Y., a corporation of New Jersey
Filed June 4, 1965, Ser. No. 467,175
16 Claims. (Cl. 29—208)

This is a continuation-in-part of copending application Serial No. 324,319 filed November 18, 1963, now abandoned. The invention relates to an assembly arrangement and, more particularly, to an automated manipulator suitable, by minor modification thereof, for performing several distinct assembly operations.

According to the general principles of the present invention, an assembly machine arrangement is adaptable for a variety of applications but is particularly useful for automatic assembly wherein relatively short runs of relatively complex devices are being assembled. In presently known automated assembly systems, it is a practice to provide specially designed tools and handling devices to accomplish a specific assembly operation. Such an assembly line is able to produce only a single item, and any changes of that item require substantial modification of the assembly line equipment. In the production of items involving millions of dollars in end product, it is feasible to design special machine tools for each product line. However, in assembling products involving thousands or even hundreds of thousands of dollars, tooling costs can become excessive if the tooling equipment is completely obsolete when a particular product run is completed.

The need has long existed for a versatile part handling and tool manipulating device which is capable of picking up a part of an assembly and transporting it to a specific location and is equally capable of securing the part by welding, soldering, bolting, thermoplastic sealing and like methods, and which device is easily and economically convertible from one type of assembly operation to another.

It is, therefore, a principal object of the present invention to provide a simple and reliable assembly arrangement easily adaptable to perform a variety of programmed operations.

A more specific object is to provide an assembly arrangement producing a plurality of motions suitable for placing a tool or part in a precisely predetermined location and at a predetermined angle of attack.

In accordance with one embodiment of my invention, a stepping motor, having several hundred discrete programmable steps per revolutions thereof, drives a linkage system to selectively drive a laterally slideable member, a serrated wheel which is rotatably secured thereto, or a tool slide which is movable radially across the serrated wheel. The sprocket ratios of the linkage are selected so that the position of the tool slide is controllable in discrete steps of the order of 1⁄32 of an inch, and its angle of attack is controllable within about a degree. On the tool slide are mounted, selectively, various assembly component-handling implements or operating tools. A major subassembly component being worked on is precisely located within the region of movement of the tools securable to the tool slide so that the functions being performed on the subassembly component may be performed in a precisely preselected location thereon.

The subject matter which is regarded as my invention is particularly pointed out and distinctly claimed in the concluding portion of this specification. The invention, however, as to its organization and operation together with further objects and advantages thereof, will best be understood by reference to the following description taken in connection with the accompanying drawings, in which:

FIG. 2 is an elevational view partially in section of equipment similar to that in FIG. 1;

FIG. 3 is a schematic view of the equipment shown in FIG. 1, illustrating several of the movements attainable with tools secured thereto; and FIG. 4 is another schematic view of several other of the motions attainable with the equipment, set in a slightly different initial position.

Figure 1:
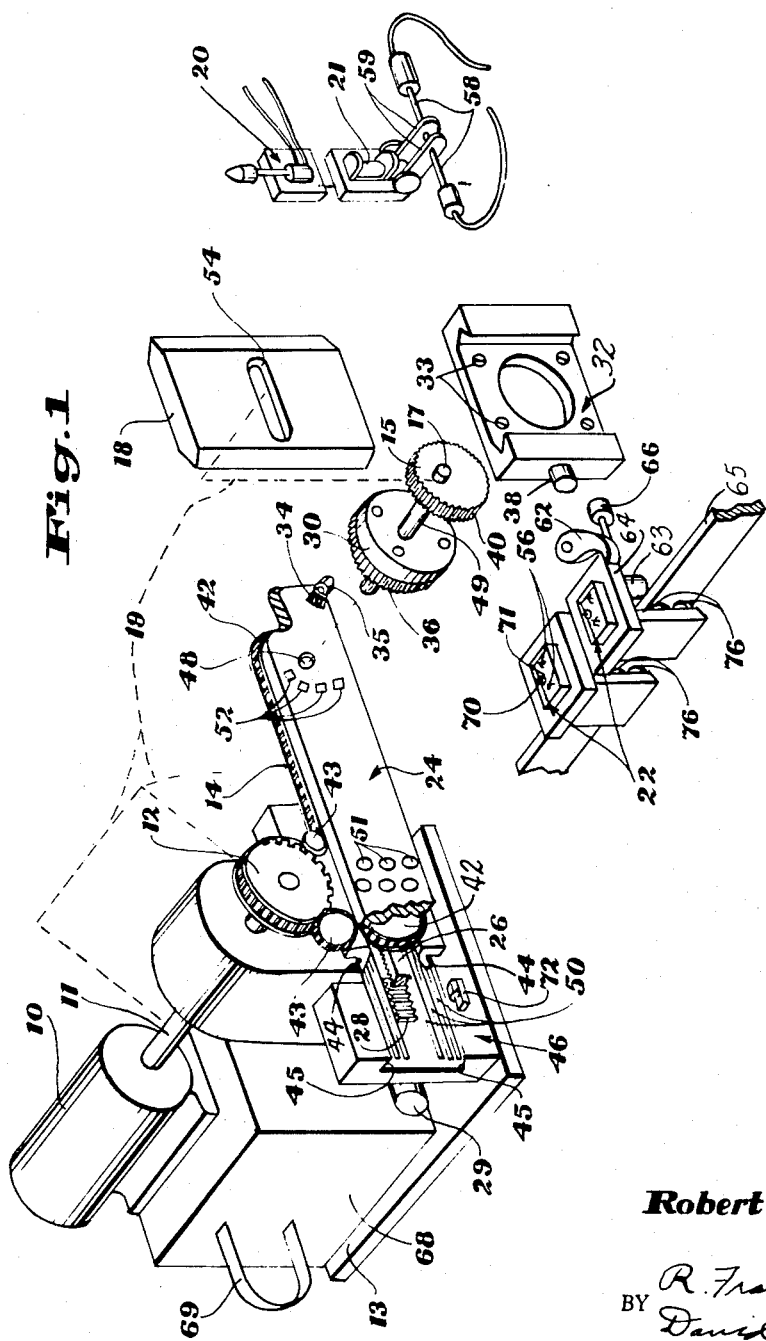
FIG. 1 is an exploded perspective view, partially in section, of one embodiment of the present invention.

Referring now to the drawings, wherein like numbers refer to similar parts, I have shown in FIG. 1 a stepping motor 10 coupled by a drive shaft 11 to a sprocket 12. These parts are each secured in a conventional manner to a support means such as a bedplate 13 which may be selectively oriented in accordance with a particular work function to be performed. The sprocket 12 is arranged to drive a non-slipping belt or chain 14, which, in turn, drives a serrated wheel 15. Coupled to the serrated wheel 15 is an eccentric drive rod 17 having thereon a cam roller which selectively drives a tool slide 18. The primary drive connection is from the motor 10, through the shaft 11, the sprocket 12, the chain 14, the serrated wheel 15 and the rod 17 to the tool slide 18, as indicated by a phantom line 19.

On the tool slide 18 may be positioned various tools such as a soldering iron 20 and/or a pick-up solenoid 21, selectively positionable to operate on a work piece such as a subassembly component 22. Although the stepping motor 10, the drive shaft 11, and the sprocket 12 could be replaced by other types of precisely controllable transducers such as stepping relays and the like, they are preferred because of their smoothness of operation, greater ease of control and their reduced probability of getting tools 20 and 21 out of phase with a control means.

It will become apparent to those skilled in the art of machinery that applying force from the sprocket 12 to the tool slide 18 will not necessarily cause a predeterminable movement thereof. For instance, the chain 14 may simply move a laterally moveable element shown as a main slide 24 toward one side without causing rotation of the serrated wheel 15. This movement of the main slide 24 is preventable by engagement between a serrated strip 26 on the back of the main slide 24 and a serrated locking pawl 28 under the control of a solenoid 29. Such locking of the main slide 24 causes the chain 14 to expend its energy elsewhere.

However, it is still not determined by the above discussed locking means what effect will be developed between the drive rod 17 and the tool slide 18. Another serrated wheel 30 may rotate freely, whereby the tool slide 18 will rotate therewith instead of being extended, or the wheel 30 may remain stationary, whereby rotation of the serrated wheel 15 causes the drive rod 17 to move the tool slide 18 upward or downward in its guide 32, which is non-rotatably secured to the wheel 30 by bolts 33 or the like. Selection of one of these two motions is accomplished by a serrated locking pawl 34 under the control of a solenoid 35 which engages the serrations 36 on the wheel 30, or a serrated locking pawl 37 (FIG. 2) under the control of a solenoid 38 which engages serrations 40 on the serrated wheel 15. The tooth-to-tooth pitch of the serrations of all of the locking means is selected to match the effective step distance developed by the stepping motor 10 and the sprocket 12.

Thus, by selective operation of two of the three solenoids 29, 35 and 38, a single mode of operation of the tool slide 18 is assured. For instance, with solenoids 35 and 38 energized, the serrated wheel 15 is locked against rotation and forms a portion of a driving connection between the chain 14 and the main slide 24. As illustrated, the main slide 24 supports a main portion of the chain 14 on a pair of sprockets 42 spaced to maintain its tension in cooperation with a pair of idlers 43. At such time as the driving of the chain 14 by the motor 10 causes the main slide 24 to move laterally over the bedplate 13, a pair of guide rails 44 supportingly transport it in a channel 45 provided in a support block 46. Although the support block 46 is shown in a horizontal position it may be slanted. Thus lateral as used hereinafter includes any transverse direction relative to the shaft 11. The length of the channel 45 in combination with the length of the guide rails 44 of the main slide 24 and the chain 14 limits the total lateral movement of the main slide 24 and the tool slide 18 supported thereby.

Obviously, the guide rails 44 and/or the channel 45 may be provided with low friction surfaces such as nylon or Teflon. Similarly, instead of a sliding support, ball bearing supports of the main slide 24 or the tool slide 18 may be used. Alternately, a larger stepping motor may be used or a plurality of synchronized stepping motors. As will become apparent from the following discussion, it is requisite to my invention that the drive means 10 does not get seriously out of phase with its control signals.

Once a desired lateral position has been attained, the motor 10 is stopped, and the serrated locking pawl 28 is energized by the solenoid 29 to engage the serrated strip 26 and fix the lateral location of a main bearing 48 for supporting a central shaft 49 of the serrated wheels 15 and 30. As shown in FIG. 1 the main slide is provided with a recess, cooperating with the channel 45 to accommodate the chain 14, the sprockets 42, and electric power and sensing circuit means including commutator bars 50 and carbon brushes 51. I prefer that the commutator bars 50 be of the printed circuit type. Similar brushes 52 transfer electrical energy to the region of the tools 20 and 21 by means of commutator rings (not shown) on the under side of the wheel 30.

It should be noted that the chain drive arrangement allows simple reversal of the main slide 24 to form right-hand or left-hand machines. Thus, two machines may be placed face to face to operate simultaneously on a single subassembly station from a single control system. Of course, with such reversal of the main slide 24, it is often necessary to relocate limit stops (not shown) and the like.

Referring again to the driving coupling arrangement, the solenoid 35, arranged to drive the serrated locking pawl 34 releases the serrations 36, whereby the wheel 30, guide 32 and the tool slide 18 are now free to rotate and correspondingly rotate the tools 20 and 21. Once the desired angle of approach is attained, the motor 10 is stopped, the serrated pawl 34 is energized by the solenoid 35 to lock the wheel 30 against further rotation. As is apparent in operating this machine, care must be taken in programming the present invention that the motor 10 is driven only when one of the solenoids 29, 35 or 38 is de-energized to release its locking pawl. Only in this way is a particular reaction to the stepping motor 10 assured.

Next, the solenoid 38 is released so that further energization of the chain 14 rotates the drive rod 17 within a drive slot 54 of the tool slide 18, while at the same time driving the tool slide 18 downward in its guide 32 in sinusoidal increments. Once the selected location of the tool, for instance the pick-up solenoid 21, is attained, the motor 10 is again stopped and the solenoid 38 is again energized whereupon the particular function such as placing a part (not shown) is completed. On the other hand, as illustrated in FIG. 1, this tool is arranged to weld a pair of wires 56 by means of electrodes 58 secured to a clamping arrangement 59 under the control of the solenoid 21.

By way of example, a complete subassembly station operation occurs in the following manner. The tool slide 18 is retracted by a previous reversing operation of the stepping motor 10 to an initial or stand-by position so that all equipment including the tools 20 and 21 are clear of the region of travel of the subassembly 22. A locking mechanism, or latch 62, is released to allow a motor 63 to drive a pallet assembly 64 along an endless track or monorail 65. As soon as the pallet 64 containing a completed subassembly clears the region of the latch 62, a solenoid 66 is de-energized to allow the latch 62 to stop a next pallet 64 having thereon a subassembly 22 which is identical to the one just released except for the modifying operation to be accomplished at this subassembly station.

When the next pallet 64 is in place, a signal is provided to a control arrangement such as a tape reader arrangement 68 having a prepunched control tape 69 thereon to initiate a subassembly operation. The tape 69 is so encoded that only one locking pawl is released during operation of the motor 10. A first function encoded on the tape 69 is to unlock the serrated pawl 28 by de-energization of the solenoid 29. A next operation is to energize the motor 10 a preselected number of steps to drive the main slide 24 so that the tool 21 is positioned over one of the pairs of wires 56. The motor 10 is then stopped, the solenoid 29 energized, and the solenoid 38 de-energized. The motor 10 is then energized to move the tool slide 18 so that the electrodes 58 encompass the one pair of wires 56 whereupon the motor 10 is again stopped, and the solenoid 21 is energized to clamp the electrodes 58 against the pair of wires 56.

The modification of the subassembly 22 is accomplished when the tool 21 is in place. A next operation energizes the electrodes 58 to weld the wires 56, or if the wires 56 are pretinned, to solder them. The signals to the solenoid 21 are preferably transmitted through the commutator bars 50, the mating brushes 51, the brushes 52 and the mating commutator bars (not shown) on the wheel 30.

Once sufficient energy has been supplied to the pair of wires 56 to accomplish securing them together, the electrodes 58 are de-energized, the solenoid 21 is de-energized to release the electrodes 58 from the wires 56, the solenoid 38 is de-energized, and the motor 10 is energized in a reverse direction to retract the tool slide 18 and the tools thereon.

If more than one similar operation is to be accomplished at this subassembly station, the solenoid 38 is then locked and the solenoid 29 is de-energized to allow the chain 14 to move the main slide 24 to another position so that a second pair of similar wires 56 may be similarly welded together by again energizing the solenoid 29, de-energizing the solenoid 38, driving the slide 18 downward to its preselected position, energizing the solenoid 21 to properly position the electrodes 58, and energizing the electrodes 58. Although indicated as such in the drawings, there is no requirement because of the operation of my invention that the pairs of wires 56 be at the same height.

The next series of operations includes retracting the tool slide 18 to raise it above the subassembly 22. However, other and different types of operations can also be accomplished at the same subassembly station by use of different tools. A different tool is positionable for operation of the subassembly 22 by rotation of the wheel 30 as much as 180°. Often, rotation substantially less than this will suffice, particularly when using a tool which is effective at a different angle of approach such as the soldering iron tool 20. The active element of the soldering iron 20 is positioned slightly upstream, in accordance with the motion of the pallet assemblies 64, from the active elements (58) of the solenoid 21. Thus, rotation as much as 120° will cause the soldering iron to have an angle of approach which will engage the subassembly 22 in back of the pairs of wires 56 at the point where a wire 70 protrudes through a presoldered contact button 71. Since the angle of approach of the soldering iron 20 is often different from that of the tool 21, the main slide 24 will usually have to be repositioned slightly from a previous operation so that driving of the soldering iron 20 toward the subassembly 22 will accomplish both bending of the wire 70 and heating of the soldered contact button 71 to develop a satisfactory low impedance solder joint at that location.

At such times as all of the operations to be accomplished at the particular subassembly station under consideration have been completed, the tool slide 18 is finally retracted from the region of the subassembly 22 and returned to the stand-by orientation, the solenoid 66 is again energized, and the assembly procedure is repeated on a next pallet 64 having a next subassembly 22 thereon. Each of these functions is separately controllable by the prepunched tape 69, which is coupled at least functionally by electrical circuit means to each of the elements operated at the subassembly station.

However, it is not necessary that the tape 69 have a channel for operating each of the equipments at a subassembly station. One indirect coupling is exemplified in FIG. 1 by a contact switch 72 which is energized by "return to stand-by motion" of the main slide 24 to cause the release of a pallet 64 when the tool 21 is returned to stand-by position. Another sensing switch will indicate positioning of the subassembly 22. Thus, the tape 69 does not need to provide an additional punched track for controlling the solenoid 66. Similarly, microswitches, thermocouples, or the like, can be used to initiate energization of some or all of the operations of the tools 20 and 21 at the time the tool is properly positioned. Such switches may be arranged in numerous specific locations to sense any specific condition of a tool, of a part, or of a subassembly, etc.

Referring now to FIG. 2, wherein the relative spacing of driving and interlocking arrangements is more clearly illustrated, I have shown the serrated wheel 15 in its proper relationship with respect to the main slide 24. Also, I have shown the serrated locking pawl 37 as disengaged from the serrations 40 so that the serrated wheel 15 is rotatable within the wheel 30 when the serrated locking pawl 34 engages the serrations 36 and the serrated locking pawl 28 engages the serrated strip 26. As shown, the locking pawl 34 maintains the guide 32 vertical, but it could as well be a 45° or any other slant. I have also shown more clearly the driving connection between the pallet assembly 64 and the endless track 65 in the form of a high frictional surface drive wheel 75 and rollers 76 which provide support for the pallet assembly 64 on the endless track 65. I prefer to use motors 63 which provide a continuous torque to prevent any bounce-back of the pallet assemblies 64 being stopped by the locking mechanism 62. Similarly, I prefer to have precise position clamping means (not shown) for the subassemblies 22 on the pallet assemblies 64 so that each subassembly station may perform its selected function on a subassembly in a precisely predetermined location relative thereto. However, such jigs and fixtures are well known and will not be explained in detail here.

Referring now to FIG. 3, I have illustrated several specific motions attainable by the above-described invention. In schematic a, starting from the stand-by position indicated by a circle, the main slide 24 is first driven to position a tool over the equipment. The tool slide 18 is then lowered, and the wheel 30 is then rotated to attain final location of a tool, which in this case may be a double-ended chisel 78 to bend two different metal parts into place respectively. At a completion of the particular operation, the process is again reversed to position the tool 78 in the initial location so that the operation may be precisely repeated.

In b, the tool, this time a staking tool, as shown at 79 is first rotated 180°, then moved downward, next moved to the side and then rotated. Although indicated as similar by the aligned circles, the stand-by positions of different tools may vary considerably, particularly if more than one tool is to be used by a machine. In c, the tool, a power-driven screwdriver 80 having automatic screw feed 81, is raised, moved to the side in several steps, and lowered between each sideways step to secure four screws to the subassembly to fasten a part previously positioned at the same or a previous subassembly station. In d, the tool, such as a resistance filament heat seal head 82, is raised, moved to the side, rotated, and lowered in one of two directions. As illustrated, the lowering actions need not be similar in magnitude. In e, the tool (such as 21 without electrodes 58) is raised, moved to one side, as might be necessary to pick up a component, then moved to the other side, and lowered again and rotated to place the component in a desired location. In some applications the side to side motion illustrated in e, will be omitted with the component being dropped straight into place, in others it will be prior to the lowering action as in d above.

Referring now to FIG. 4, several other motions are described wherein a tool is initially positioned with the slide 18 being slanted about 45°. In schematic a, the tool is first moved to the side, then extended outwardly, and finally rotated. After the particular operation has been completed, the tool is returned along the same path. In schematic b, the tool is first lowered, then moved outwardly and then rotated. In schematic c, the tool is lowered only partially, moved outwardly and rotated on a smaller arc because of the partial, rather than complete, extension thereof. In schematic d, the tool such as a high-speed drill 83 is first raised, then moved outwardly, then partially lowered, then moved on a small arc and then lowered more completely and brought inward to engage by way of example, a remote surface of the subassembly 22. In schematic e, the tool is raised, moved outwardly, lowered substantially, rotated, moved back, and then extended further.

It is obvious from these examples that a very large number of different combinations of tools including reamers, taps, test probes, gages, etc., as well as many movements are possible. Furthermore, the positioning of a tool is also selectable by the initial positioning of the tool itself (e.g., 83). The tool can work primarily downward, primarily upward, or primarily to one side. Moreover, the complete subassembly station, or the monorail track 65, or the support block 46 may be turned or tilted as a particular combination of operations of a subassembly dictate.

Probably one of the most important features of the present invention is the automatic versatility that should now be apparent to those skilled in this art. Obviously, the slide 18 may be arranged to support any type of tool necessary for a particular assembly function without materially changing the overall construction of the system except for the particular prepunched tape 69 being utilized. With punched tape controls or other repetitive controls, it is feasible to use either short or long tapes so that many separate control signals may be generated or only a few need be generated.

While I have shown and described particular embodiments of the present invention, other modifications may occur to those skilled in this art. For instance, the locking pawls 28, 34 and 37 could be normally closed and opened only when energized instead of the reverse arrangement as discussed above. Also, usual good tool design techniques should be used such as providing means for maintaining tension on the chain 14 by use of adjustable bearings on one of the sprockets 42 or 43. Tension adjustment may be accomplished by adjustable bearings as indicated in dashed lines at 84 in FIG. 2. I intend, therefore, to have the appended claims cover all modifications which fall within the true spirit and scope of my invention.

I claim:
1. In a system suitable for selectively moving a component to a predetermined location at a predetermined orientation, a drive arrangement comprising:
   control means;
   drive means secured to a support means and responsive to said control means;
   a linkage system coupling said drive means to the component and including a laterally moveable element slidably supported on the support means, a rotatable element rotatably supported on said laterally moveable element, and a slider element slidingly supported on said rotatable element and supporting the component; and
   interlocking means responsive to said control means for selectively preventing relative motion of two of said linkage elements whereby said drive means moves the component in accordance with the linkage element that remains free to move.

2. A drive arrangement in accordance with claim 1 wherein said control means is arranged to energize said drive means only when one of the linkage elements is free to move.

3. A drive arrangement in accordance with claim 1 wherein said control means includes an endless signal means containing a plurality of signal channels for sequentially operating said drive means and said elements to repeatedly move the component from a standby position to a work piece.

4. In a system suitable for selectively moving a component to a predetermined location at a predetermined orientation, a drive arrangement comprising:
   control means;
   drive means secured to a bedplate and responsive to said control means for driving the component a predetermined number of discrete increments;
   a linkage system coupling said drive means to the component and including a laterally moveable element slidably supported on the bedplate, a rotatable element rotatably supported on said laterally moveable element, and a slider element slidingly supported on said rotatable element and supporting the component;
   interlocking means responsive to said control means for selectively preventing relative motion of two of said linkage elements whereby said drive means moves the component in accordance with the remaining moveable linkage element; and
   means for positioning a work piece adjacent to the bedplate in a predetermined location relative thereto, said control means being responsive to the positioning of the work piece to operate said drive means to selectively drive at least one of said elements to cause said component to engage said work piece at a preselected location thereof and at a preselected orientation.

5. An assembly arrangement in accordance with claim 4 wherein the component is a tool, which is energizable to modify at least one portion of the work piece.

6. In a system suitable for selectively moving a component to a predetermined location at a predetermined orientation, a drive arrangement comprising:
   control means;
   drive means including a non-slipping belt means secured to a support and responsive to said control means, said drive means being energized in accordance with said control means to drive the component a predetermined number of discrete increments;
   a laterally moveable linkage element slidably supported on the support, to be driven directly by the belt means;
   a rotatable linkage element rotatably supported on said laterally moveable element to be driven by a sprocket drivable by the belt means;
   a slide linkage element slidingly supported on said rotatable element and supporting the component; and
   interlocking means responsive to said control means for selectively preventing motion of all but one of said linkage elements whereby said drive means is controlled to move the component in accordance with the one unlocked linkage element.

7. In a drive arrangement as defined in claim 6 including:
   a serrated wheel non-rotatably lockable by two of said interlocking means to drivingly couple said belt means to said laterally movable element.

8. In a drive arrangement as defined in claim 6 including:
   a guide member for said slide linkage element;
   a serrated wheel lockable to said guide member by a first of said interlocking means, with said guide member being non-rotatably lockable to said laterally movable element by a second of said interlocking means whereby engagement of said first and second means will non-rotatably lock said serrated wheel.

9. A drive arrangement as defined in accordance with claim 8, wherein a third of said interlocking means is arranged to prevent lateral motion of said laterally movable element whereby engagement of said second and third means prevents lateral motion or rotation of said rotatable linkage element.

10. In a drive arrangement as defined in claim 9 including:
    an eccentric drive rod secured to said serrated wheel to drivingly engage said slide linkage element.

11. In a system suitable for selectively and repetitively moving a component from a stand-by position to a predetermined location at a predetermined orientation, a drive arrangement comprising:
    control means for repetitively producing a series of control signals;
    drive means secured to a support and responsive to said control means to be energized to drive the component predetermined number of discrete increments in response to the series of control signals;
    means for positioning a subassembly work piece adjacent to the support in a predetermined location relative thereto, said control means being responsive to the positioning of the work piece to operate said drive means through one of the series of control signals;
    a linkage system coupling said drive means to the component and including:
       a laterally moveable linkage element slidably supported on the support to position a bearing over the work piece,
       a rotatable linkage element rotatably supported in the bearing on said laterally moveable element, and
       a slider linkage element slidingly supported on said rotatable element for supporting the component; and
    interlocking means responsive to said control means for selectively preventing response by each of said three linkage elements respectively to said drive means, the series of control signals being arranged to disengage only one of the said linkage elements during each operation of said drive means whereby said drive means moves sequentially the component in accordance with the one of said linkage elements which is disengaged to cause the component to engage the work piece.

12. In a system suitable for selectively moving a component to a predetermined location at a predetermined orientation, a drive arrangement comprising:
    control means;
    drive means responsive to said control means;
    a linkage system coupling said drive means to the component and including a laterally positionable element, a selectively rotatable linkage element supported on said laterally positionable element, and a slider linkage element slidingly supported on said rotatable linkage element and supporting the component; and interlocking means responsive to said control means for selectively allowing motion of only one of said linkage elements in response to operation of said drive means.

13. In a system suitable for selectively moving a component to a predetermined location at a predetermined orientation relative to a main support and including drive means, a linkage system operable by the drive means for movably positioning the component relative to the support, and means for controlling the operation of said drive means, the improvement wherein the linkage system includes:

a laterally positionable element movably supported on the main support;

a rotatable element rotatably supported on said laterally positionable element;

a slide element slidingly mounted on said rotatable element and supporting the component; and interlocking means responsive to the control means for selectively allowing motion of only one of said linkage elements relative to its respective support whereby said drive means moves the component in accordance with the movement of that linkage element which remains free to move relative to its support.

14. In a system suitable for selectively moving a component to a predetermined location at a predetermined orientation relative to a main support and including drive means, a linkage system selectively operable by the drive means for positioning the component, and control means, the improvement wherein the linkage system includes:

a first element supported by and laterally positionable on the main support;

a rotatable element supported on said first element;

a slide element mounted on said rotatable element and selectively supporting the component; and interlocking means selectively responsive to the control means, the control means allowing motion of only one of said linkage elements relative to its respective support during a given period of operation of the drive means, whereby the component is driven along a preselected path.

15. In a system defined in claim 14 with the drive means including a stepping motor, the improvement wherein said interlocking means is of a relative spacing configuration to lock each of said elements between any two steps of the drive means.

16. In a system defined in claim 15 the further improvement wherein said interlocking means including a separate locking means for each of said elements with each locking means being selectively responsive to the control means.

References Cited by the Examiner

UNITED STATES PATENTS 2,896,313 7/1959 Brewer _____ 29—208
2,961,752 11/1960 Jorgensen et al. _____ 29—208 X WHITMORE A. WILTZ, *Primary Examiner.*

THOMAS H. EAGER, *Examiner.*